United States Patent [19]
Schoenberg et al.

[11] 3,944,428
[45] Mar. 16, 1976

[54] ALKALINE CURING CORRUGATING ADHESIVE

[75] Inventors: Jules E. Schoenberg, Scotch Plains; Dilip K. Ray-Chaudhuri, Somerville, both of N.J.

[73] Assignee: National Starch and Chemical Corporation, Bridgewater, N.J.

[22] Filed: Mar. 6, 1975

[21] Appl. No.: 555,934

[52] U.S. Cl. ............................................ 106/213
[51] Int. Cl.$^2$ .................... C08B 25/02; C08B 27/22
[58] Field of Search ............ 106/213; 260/72, 63 N, 260/64

[56] References Cited
OTHER PUBLICATIONS
Chem. Abst. 73: 35319v.

*Primary Examiner*—Theodore Morris

[57] ABSTRACT

Starch-based alkaline curing corrugating adhesives, containing a novel crosslinking additive comprising acetoacetamide-formaldehyde condensate, are useful in the manufacture of corrugated paperboard. These adhesives are characterized by their excellent stability with respect to viscosity, their long pot life and their ability to form water-resistant bonds, particularly after aging.

16 Claims, No Drawings

ALKALINE CURING CORRUGATING ADHESIVE

BACKGROUND OF THE INVENTION

I. Field of the Invention

This invention relates to starch based alkaline curing adhesive composition specifically intended for use in the manufacture of corrugated paperboard.

II. Brief Description of the Prior Art

In the production of corrugated board, the procedure usually employed involves a continuous process utilizing a strip of paperboard corrugated by means of heated fluted rolls. An adhesive is applied to the tips of the protruding flutes on one side of the corrugated strip, a flat strip of another paperboard is then brought into contact with these tips, and, by the application of heat and pressure, a bond is formed. This procedure is then repeated on the other side of the corrugated strip so as to yield a hard sheet of paperboard comprising an inner corrugated layer contained between two flat outer layers.

The adhesive composition most widely used in the above process comprises raw, ungelatinized starch suspended in an aqueous dispersion of cooked starch. The cooked starch dispersion, being rather viscous, serves as a carrier to keep the ungelatinized starch in suspension. At the point in the corrugating process where the flutes of the corrugated paperboard are to be adhered to the flat paperboard, sufficient heat is applied to gelatinize the raw, ungelatinized starch component of the adhesive, resulting in a sudden rise in viscosity and the formation of the adhesive bond.

Since it is often desired or necessary that the corrugated adhesive yield waterproof or water-resistant bonds, several procedures have been devised to produce potentially waterproof adhesive compositions for use in the manufacture of corrguated paperboard. In one such procedure, amylaceous material has been combined with urea-formaldehyde resins using aluminum sulfate as a catalyst to produce waterproof or water-resistant bonds. These compositions must be prepared at a pH of less than 5 in order to enable the resin to function as the waterproofing agent. This low pH, however, imparts poor flow properties to the adhesive composition, thus resulting in greatly reduced machine speeds, corrosion of the glue rolls, and prevention of the development of many desirable paste characteristics such as tackiness, viscosity, rate of setting and other properties. In another method, amylaceous material is cooked, under alkaline conditions, with urea-formaldehyde resins which set or harden at a pH of above 7. Although the bonds of corrugated board prepared from these adhesives show some improvement in water resistance, on exposure to wet weather conditions they nevertheless tend to delaminate and fail to pass U.S. Government specifications for corrugated paperboard.

Other waterproofing corrugating adhesives, such as those employing resorcinol and formaldehyde with starch, similarly suffer from serious drawbacks. The cost of these adhesives is often prohibitive because of the large amounts of resorcinol that is required. In addition, these adhesives have a short pot life at the pH range most useful for maximum production speeds. Other shortcomings of this adhesive include the slow rate of bond formation which results from its incompatibility with borax which is often added to starch-based adhesives as a tackifying agent to improve machine speeds.

Still other waterproofing corrugating adhesives employ the reaction product of acetone with formaldehyde as the waterproofing agent. A particular shortcoming of these adhesives is their short pot life. Thus, when acetone-formaldehyde condensates are added to conventional starch based adhesives and the mixture allowed to age, the wet strength after 24 hours aging is considerably lower than after 4 hours aging. The practical consequence is that the corrugated paperboard manufacturer is frequently forced to discard adhesive that has not been used within a certain period of time Recently, adhesive compositions, as disclosed in U.S. Pat. No. 3,728,141, have been provided which employ the condensation product of diacetone acrylamide and formaldehyde and which exhibit superior pot life properties for periods up to about 24 hours. Additionally, it has been found that these diacetone acrylamide-formaldehyde condensates may be diluted with acetone in amounts up to 3 moles of acetone per mole of diacetone acrylamide in order to provide a more economical product without significantly reducing the pot stability. There are instances, however, when even longer pot life than that exhibited by the diacetone acrylamide condensate is required. Moreover, when the question of such extended shelf lift is not at issue, it may be economically desirable to dilute the condensate in amounts greater than the 3 mole acetone maximum allowed in the adhesives of the patent without reducing pot stability at the 24 hour level.

It is therefore an object of the present invention to provide a novel class of waterproofing corrugating adhesive compositions which are stable for extended period of time and which may be diluted with acetone in large amounts without reduction in critical properties.

SUMMARY OF THE INVENTION

We have now found that the use of specified concentrations of the condensation product of an acetoacetamide and formaldehyde as the crosslinking agent, in place of urea-formaldehyde resins or formaldehyde resins or formaldehyde-diacetone acrylamide condensates, in otherwise conventional starch-based corrugating adhesives provides these adhesives with superior water resistant bonding properties, viscosity stability and pot life, particularly when the adhesives are employed over extended periods of time. In addition, these adhesives possess excellent tack, flow and machining properties, and are fully compatible with water proofing agents of the prior art. Moreover, the water resistance of the corrugated boards prepared using these adhesives is attained within a short time after they have left the machine, thereby facilitating their further processing. In addition, the use of these adhesive compositions employing conventional corrugating equipment and processes makes possible high production speeds because of the higher alkalinity employed and the compatibility with borax. The offensive or toxic odors that often arise from the use of formaldehyde or resorcinol with starch are avoided and, in general, the overall efficiency and economy of the corrugating process is increased.

As an additional feature of the present invention, it has also been found that an acetone-formaldehyde condensate may be used to replace up to about 85% by weight of the acetoacetamide-formaldehyde condensate. A replacement with such weight percent of condensate corresponds to a replacement of up to about 9 moles acetone per mole acetoacetamide. The use of such a large amount of acetone serves to drastically lower the cost of the resultant adhesive with no significant decrease in water resistant bonding properties, viscosity stability or pot life.

The novel corrugating adhesives of the present invention comprise (a) from about 10 to 40%, preferably 18 to 30%, based on the total weight of the adhesive, of starch, this including the minor gelatinized portion as well as the ungelatinized portion of the starch; (b) from about 0.3 to 4% based on the total weight of the starch, of an alkali, such as sodium hydroxide; (c) a crosslinking member in a concentration of from about 0.3 to 10%, preferably 1 to 5%, based on the total weight of the starch, comprising at least 15%, based on the weight of the crosslinking member, of an acetoacetamide-formaldehyde condensate; and (d) from about 54 to 89% of water, based on the total weight of the adhesive. In order to further improve the tackifying properties of these adhesives, the practitioner may, if desired, introduce borax in a concentration of up to about 4% based on the total weight of the starch. Optionally, other ingredients such as fillers, pigments, peptizing agents for starch such as urea, stabilizing salts, etc. may be employed in the total adhesive formulation.

DETAILED DESCRIPTION OF THE PREFERRED EMBODIMENTS

The term "starch," as used herein, is meant to refer to native, raw starches as well as to modified starches such as oxidized, esterified, etherified, dextrinized and hydrolyzed starches which still retain their amylaceous characteristics. Suitable starches may be derived from any sources, including corn, wheat, potato, tapioca, waxy maize, waxy sorghum, rice, etc. High amylose starches derived from genetically modified sources may also be used herein.

In these compositions, a major portion, preferably from about 65 to 92%, of the starch is employed in its ungelatinized, raw form, suspended in a viscous carrier which usually comprises the remaining 8 to 35% of the starch in the form of a cooked, gelatinized aqueous dispersion. Although any of the above mentioned starches may be used as the carrier portion, high amylose corn starch is preferred. Upon application of heat during the corrugating process, the uncooked starch gelatinizes to produce the required viscosity increase and tack, which, in turn, makes possible the adhesive bond. the viscous carrier essentially serves to deliver the uncooked starch to the interface, where the in situ gelatinization and adhesion is to take place, and also contributes to the strength of the adhesive bond.

While the viscous carrier generally employed is an aqueous dispersion of cooked, gelatinized starch, it is to be noted that a number of water-dispersible, polyhydroxypolymeric materials including cellulose derivatives such as sodium carboxymethyl cellulose, polyvinyl alcohols and hydrolyzed polyvinyl acetates may also be employed. No borax should be used in preparing adhesives which include polyvinyl alcohol because of their relative incompatibility.

The acetoacetamides employed in the present invention contain four to twelve carbon atoms and have the following structure:

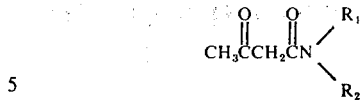

wherein $R_1$ and $R_2$ are hydrogen, alkyl groups, cycloalkyl groups, aryl groups, hydroxyalkyl groups, alkoxyalkyl groups or may be joined to form a heterocyclic ring. Exemplary of the various acetoacetamides which may be used are acetoacetamide, N-methylacetoacetamide, N,N-dimethylacetamide, N-2-hydroxyethylacetoacetamide, N,N-pentamethyleneacetaoacetamide, N,N-oxydi-ethyleneacetoacetamide and N,N-bis-(2-hydroxyethyl)acetoacetamide.

The acetoacetamides useful herein are generally prepared by the reaction of diketene with a primary or secondary amine or with ammonia in a relatively inert solvent, such preparations being well described in the literature.

The acetoacetamide is condensed with the formaldehyde in a ratio of 2 to 6 moles formaldehyde per mole acetoacetamide in order to produce the condensates useful in the adhesives of the present invention. Since the absolute value of the water resistance has been found to be relatively lower at lower formaldehyde levels and increases with higher levels, the condensates most useful in our novel corrugating adhesives are those prepared using at least 3.5 moles formaldehyde per mole acetoacetamide.

In a typical procedure for preparing the condensate, the acetoacetamide is diluted with water and mixed with paraformaldehyde (or other source of formaldehyde) while maintaining the pH of the reaction mixture at from 9.5 to 11.5 using an aqueous solution of any common base such as sodium or potassium hydroxide. Examples of other bases operable herein include alkali metal carbonates such as sodium carbonate and alkali metal silicates such as sodium silicate. While moderate heat may be applied to initiate and to hasten the reaction rate, the reaction is exothermic and temperatures above 50°C. are usually unnecessary. At the completion of the reaction, about 2 to 6 hours, the reaction mixture is usually neutralized using any common acid such as hydrochloric or sulfuric acid. Procedures including variations of the above described procedure for preparing such condensates are well known to those skilled in the art.

When acetone is used to replace part of the acetoacetamide, the acetone may be condensed with the formaldehyde in a ratio of one mole acetone per 2 to 6 moles formaldehyde and the thus formed condensate then added directly to the adhesive composition or mixed with the acetoacetamide-formaldehyde condensate and added as a mixture to the adhesive. Alternatively, a three component condensate may be formed in one operation by admixing the acetoacetamide with the acetone in an amount of up to 9 moles acetone per mole acetoacetamide. The formaldehyde source would then be condensed with the acetone/acetoacetamide mixture in a ratio of 2 to 6 moles formaldehyde per combined moles of the acetone and acetoacetamide.

Regardless of the manner of preparation of the acetone-containing condensate, the acetone-formaldehyde condensate may be used to replace up to 85% by weight (solid basis) of the acetoacetamide-formaldehyde condensate without serious loss in viscosity stability. It will be appreciated, however, by those skilled in the art that a number of factors are involved in determining the maximum replacement permitted, including in particular the total amount of condensate used and the type of starch employed in the adhesive composition.

It will also be understood to those skilled in the art that the specific procedure for the preparation of our novel corrugating adhesive is not critical since the adhesive may be prepared in any conventional manner that will provide in the final product a uniform mixture of a dispersion of a gelatinized starch (sometimes referred to as "the carrier"), ungelatinized starch which serves as the major dry component of the corrugating adhesive, alkali and the acetoacetamide formaldehyde condensate. The concentration of the components should be within the ranges set forth hereinbelow. Borax, if not incompatible with the other ingredients, as well as other ingredients such as fillers, pigments, peptizing agents for starch such as urea, stabilizing salts, etc., may also be incorporated in our adhesives, if desired. It is to be noted, however, that an effective corrugating adhesive can be formulated using the condensates disclosed herein without the addition of any of these optional ingredients.

In more detail, the preparation of our corrugating adhesives may be described as follows:

PREPARATION OF GELATINIZED STARCH CARRIER

A slurry of the carrier portion of the starch, ordinarily about 3 to 10% of the total weight of the adhesive composition, is heated to a temperature ranging from 50° to 80°C. An aqueous solution of alkali is added thereto; alternatively, the alkali may be added in solid form as, for example, in flake or pelletized form. The alkali employed herein is preferably sodium hydroxide. Examples of other alkalies which may be employed separately or in combination with the sodium hydroxide include borax as well as alkali metal hydroxides such as potassium hydroxide, alkali metal carbonates such as sodium carbonate, and alkali metal silicates such as sodium silicate. Heating and agitation is continued for a period of time ranging from 5 to 30 minutes, after which time heating is terminated and water is added to cool and dilute the dispersion.

PREPARATION OF THE FINAL ADHESIVE

The thus prepared gelatinized starch is slowly added to a slurry comprising the remaining starch (which is ungelatinized) and water (and borax, if used), and agitation is continued until the adhesive is smooth and uniform. The preparation of the adhesive is completed by adding the desired concentration of the selected acetoacetamide-formaldehyde condensate.

It can be appreciated that several variations may be readily utilized in the preparation of our corrugating adhesives as described above. Thus, it is also common in the art to incorporate the borax in the carrier dispersion, either prior to or after heating. Likewise, it is acceptable to add the acetoacetamide-formaldehyde condensate to the carrier or to the ungelatinized starch slurry prior to preparation of the final adhesive.

The following examples will further illustrate the embodiments of our invention. All parts given are by dry weight unless otherwise noted.

EXAMPLE I

This example illustrates a typical procedure for the preparation of the acetoacetamide-formaldehyde condensate used in the novel corrugating adhesives of the present invention.

PREPARATION OF THE ACETOACETAMIDE

A reaction vessel equipped with a stirrer, thermometer and dropping funnel was charged with 2.0 moles (220.1 g.) of a 40.8% by weight solution of dimethylamine in water and 2.0 moles (168.3 g.) diketene was added dropwise thereto. During the addition which lasted 1 ½ hours, the reaction vessel was stirred vigorously and immersed in an ice-bath to maintain the temperature below 20°C. At the end of the addition, the reaction mixture was allowed to warm to room temperature over a one hour period. The final pH was 5.4. The product was N,N-dimethylacetoacetamide dissolved in water.

PREPARATION OF THE CONDENSATE

A round bottom flask equipped with a stirrer, thermometer, ph electrode and condenser with Mallcosorb tube to provide protection from atmospheric carbon dioxide was charged with 0.20 mole (38.8 g.) of the aqueous N,N-dimethylacetoacetamide solution, 0.06 mole (19.0 g.) paraformaldehyde containing 95% polymerized formaldehyde and 19.1 g. water. Then 2.2 ml. of 10 M NaOH in water was added in increments to maintain the pH of the system between 9.1 and 11.6. After a total reaction time of 3 hours, at 40°C., the reaction mixture was cooled and the product neutralized with concentrated hydrochloric acid. A sample dried for 24 hours at 60°C. lost 50.5% of the original weight indicating the condensate had a solids content of 49.5%.

A cocondensate of formaldehyde with acetone and acetoacetamide was prepared by admixing 2 moles of acetone with 1 mole N,N-dimethylacetoacetamide and condensing with 12 moles formaldehyde in a manner similar to that described above.

For control purposes, condensates of acetone and formaldehyde and condensates of diacetone acrylamide and formaldehyde were also prepared.

EXAMPLE II

This example illustrates the preparation of a typical corrugating adhesive of the invention.

PREPARATION OF GELATINIZED STARCH

To 100 grams of water was added 28 grams of corn starch and the slurry was heated to 60°C. with agitation. About 75 grams of water containing 5 grams of sodium hydroxide was then added to the slurry and heating was continued for a period of 15 minutes. At the end of this period heating was terminated and about 143 grams of water was added to cool and dilute the resultant dispersion.

PREPARATION OF THE FINAL ADHESIVE

The thus prepared gelatinized starch dispersion was thereafter added to a slurry comprising 197 grams of corn starch, 3.5 grams of borax ($Na_2B_4O_7 \cdot 5H_2O$) and 325 grams of water. The mixture was agitated for a period of 10 minutes after which time 6.3 grams dry weight (2.8% based on the weight of the total starch) of the N,N-dimethylacetoacetamide formaldehyde condensate, prepared as described in Example I hereinabove, was added thereto and stirring was continued until the adhesive was uniform in texture.

Fiberboard produced by using the described adhesive was water resistant and passed ASTM specification D1028-59.

EXAMPLE III

It is well recognized that cooked starch dispersions (and corn starch dispersions containing a crosslinking agent of the prior art in particular) will tend to thicken or gel upon standing, and this phenomenon is usually observed in corrugating adhesives based on such starch dispersions. In contrast, the corrugating adhesives of this invention, by virtue of the added acetoacetamide-formaldehyde condensate, exhibit a relatively stable viscosity over a given period of time as compared to comparable prior art adhesives. The table below summarizes viscosity data obtained on testing the wet strength agents of the invention using corn starch as a carrier and prepared as described hereinabove. In this series of tests, the acetoacetamide-formaldehyde condensate prepared in Example I was tested against controls containing no wet strength additives and a control containing the acetone-formaldehyde additive of the prior art, the preparation of which was also described in Example I.

Table I

| Material tested | Viscosity after 24 hours | |
|---|---|---|
| | CPS | Spindle No. |
| N,N-dimethylacetoacetamide-formaldehyde condensate of Example I. | 157 | 1 |
| No wet strength agent | 252 | 1 |
| Acetone formaldehyde condensate prepared according to Example I. | 21,000 | 6 |

It is seen that the viscosity of the novel adhesives of the present invention are significantly lower than the viscosity of the control samples when allowed to stand for a 24 hour period. Such stability with respect to viscosity is particularly significant to the corrugated board manufacturer since extreme variations in viscosity are not in keeping with the uniformity and control desired in the commercial manufacture of corrugated board.

EXAMPLE IV

The water resistant properties of bonds formed with starch based corrugating adhesive are largely derived from the crosslinking of the starch which takes place at the bonding interface during the in situ gelatinization. Where premature crosslinking of the starch takes place prior to actual use of the adhesive, the starch will have little or no potential remaining to crosslink at the bonding site of the paperboard laminate. As demonstrated in the previous example, the superior pot life of the adhesives of this invention, as evaluated by means of a viscosity-time-temperature relationship indicated little, or no, crosslinking to take place during a 24 hour aging period. It is to be expected therefore that the adhesives of the present invention, even after aging, would be capable of forming bonds having a high degree of water resistance.

Accordingly, the following procedure was used in determining and effectively demonstrating the improved pot life of the adhesive compositions of this invention. Adhesive compositions of the present invention using a high amylose corn (70%) starch as the carrier and containing condensates of various acetoacetamide derivatives and formaldehyde in varying molar proportions were prepared using the procedure described in Example II.

The comparable adhesives were prepared in a similar manner except that one contained only a commercially available acetone-formaldehyde condensate and one adhesive contained the diacetone acrylamide-formaldehyde condensate.

All of the adhesives were aged for a period of 24 hours at a temperature of 40°C. and laminations were prepared utilizing 60 lb. per ream wet strength paper and adhesive films of 1.5 and 3.0 mils thickness of each adhesive, respectively. The laminates were placed on a hot plate at a temperature of 177°C. applying nominal pressure (0.25 psi) for a period of 20 seconds. The laminates were than placed in a conditioning atmosphere (22°C., 50% relative humidity) for 24 hours and thereafter, strips of these laminates were placed in water at 22°C. for a period of 24 hours.

At the end of this period the laminates were blotted on paper towels in order to remove the excess water and the peel strength of each bond was determined with an Instron Tensile Tester. The results of this testing are presented in Table II below.

The results shown in this table indicate clearly the superior water-resistant bonds which may be achieved utilizing the corrugating adhesive of our invention. Thus, the compositions containing a variety of acetoacetamide-formaldehyde condensates produced bonds in which the water resistance was significantly less affected by aging than those bonds produced utilizing either compositions containing acetone-formaldehyde or diacetone-acrylamide additives of the prior art.

Table II

| Wet Strength Agent Acetoacetamide Derivative | Moles form Mole Acet. | Peel Force (lbs/linear in) | | | |
|---|---|---|---|---|---|
| | | 1.5 mil | | 3.0 mil | |
| | | 4 hours | 24 hours | 4 hours | 24 hours |
| Acetoacetamide | 2.0 | 0.10 | 0.11 | 0.10 | 0.06 |
| " | 3.0 | 0.08 | 0.14 | 0.07 | 0.09 |
| " | 4.0 | 0.16 | 0.15 | 0.10 | 0.11 |
| " | 5.0 | 0.18 | 0.17 | 0.09 | 0.08 |
| N-methylacetoacetamide | 2.0 | 0.11 | 0.09 | 0.08 | 0.05 |
| | 3.0 | 0.13 | 0.14 | 0.09 | 0.08 |
| | 4.0 | 0.15 | 0.17 | 0.11 | 0.11 |
| | 5.0 | 0.18 | 0.15 | 0.10 | 0.09 |
| N,N-dimethylacetoacetamide | 2.0 | 0.10 | 0.10 | 0.07 | 0.07 |
| | 3.0 | 0.12 | 0.12 | 0.08 | 0.10 |
| | 4.0 | 0.15 | 0.16 | 0.11 | 0.11 |
| | 5.0 | 0.18 | 0.16 | 0.11 | 0.09 |

Table II-continued

| Wet Strength Agent Acetoacetamide Derivative | Moles form Mole Acet. | Peel Force (lbs/linear in) | | | |
|---|---|---|---|---|---|
| | | 1.5 mil | | 3.0 mil | |
| | | 4 hours | 24 hours | 4 hours | 24 hours |
| N-2-hydroxyethyl-acetoacetamide | 2.0 | 0.08 | 0.09 | 0.05 | 0.04 |
| | 3.0 | 0.12 | 0.12 | 0.06 | 0.05 |
| N,N-bis-(2-hydroxy-ethyl)acetoacet-amide | 2.0 | 0.09 | 0.08 | 0.07 | 0.06 |
| | 3.0 | 0.11 | 0.08 | 0.09 | 0.08 |
| | 4.0 | 0.12 | 0.10 | 0.12 | 0.08 |
| Acetone formalde-hyde condensate | | 0.19 | 0.11 | 0.15 | 0.07 |
| Diacetone acryl-amide-formalde-hyde condensate | | 0.21 | 0.14 | 0.17 | 0.11 |

EXAMPLE V

This example shows the preparation of adhesives typical of this invention wherein portion of the acetoacetamide-formaldehyde condensate was replaced with an acetone-formaldehyde condensate.

An N,N-dimethylacetoacetamide-formaldehyde condensate containing 5 moles formaldehyde per mole acetoacetamide and an acetone-formaldehyde condensate were separately prepared as described in Example I. A series of adhesives was then prepared with mixtures of the two condensates in varying proportions using the procedure described in Example II. In all cases, the corrugating adhesive contained 2.8% of the crosslinking agent. The adhesives were then tested for viscosity stability and the results are shown in Table III.

Table III

| Wt. ratio acetone-formaldehyde condensate to acetoacetamide-formaldehyde condensate | Viscosity after 24 hrs. | |
|---|---|---|
| | CPS | Spindle No. |
| No wet strength additive | 252 | 1 |
| 0/100 | 157 | 1 |
| 50/50 | 100 | 1 |
| 70/30 | 290 | 2 |
| 80/20 | 280 | 2 |
| 85/15 | 500 | 3 |
| 90/10 | 15,000 | 6 |
| 100/0 | 21,000 | 6 |

It is seen from the above data that condensate mixtures prepared containing at least 15% by weight of the acetoacetamide-formaldehyde condensate can be employed in the adhesives of the present invention without significant decrease in viscosity stability.

Summarizing, it is seen that this invention provides novel corrugating adhesives which are characterized by their stability with respect to viscosity, prolonged pot life and their ability to form water resistant bonds, particularly after aging.

We claim:

1. A corrugating adhesive comprising (a) starch in a concentration of from about 10 to 40%, based on the total weight of the adhesive, wherein a minor portion of the starch is gelatinized and the remainder is ungelatinized; (b) an alkali in a concentration of from about 0.3 to 4%, based on the total weight of starch; (c) a crosslinking member in a concentration of from 0.3 to 10%, based on the total weight of the starch, comprising at least 15%, based on the weight of the crosslinking member, of an acetoacetamide-formaldehyde condensate wherein the acetoacetamide contains from four to 12 carbon atoms and has the following structure:

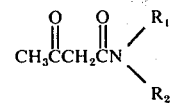

where $R_1$ and $R_2$ are selected from the group consisting of hydrogen, alkyl, cycloalkyl, aryl hydroxyalkyl, alkoxyalkyl groups; or $R_1$ and $R_2$ may be jointed to form a heterocyclic ring; wherein the acetoacetamide-formaldehyde condensate contains from about 2 to about 6 moles formaldehyde per mple acetoacetamide and the pH during the formation of the condensate is 9.5 to 11.5 and (d) from about 54 to 89% water, based on the total weight of the adhesive.

2. The adhesive of claim 1 wherein the acetoacetamide compound is selected from the group consisting of acetoacetamide, N-methylacetoacetamide, N,N-diemthylacetoacetamide, N-2-hydroxyethylacetoacetamide, N,N-pentamethyleneacetoacetamide, N,N-oxydiethyleneacetoacetamide and N,N-bis-(2-hydroxyethyl) acetoacetamide.

3. The adhesive of claim 1 wherein the alkali is sodium hydroxide.

4. The adhesive of claim 1 wherein there is also present borax.

5. The adhesive of claim 1 wherein the gelatinized starch is at least partially replaced with water dispersible, polyhydroxy-polymeric material selected from the group consisting of sodium carboxymethyl cellulose, polyvinyl alcohol and hydrolyzed polyvinyl acetate.

6. The adhesive of claim 1 wherein the gelatinized starch is high amylose corn starch.

7. The adhesive of claim 1 wherein the acetoacetamide-formaldehyde condensate contains at least 3.5 moles formaldehyde per mole acetoacetamide.

8. The adhesive of claim 1 wherein the cross-linking member additionally includes a condensate of acetone-formaldehyde.

9. The adhesive of claim 9 wherein the acetone-formaldehyde condensate contains from about 2 to 6 moles of formaldehyde per mole acetone.

10. The adhesive of claim 1 wherein the crosslinking member comprises at least in part an acetoacetamide-acetone-formaldehyde condensate.

11. The adhesive of claim 11 wherein the acetoacetamide-acetone-formaldehyde condensate contains 2 to 6 moles formaldehyde per combined moles acetoacetamide and acetone.

12. A corrugating adhesive comprising (a) corn starch in a concentration of from about 18 to 30% based on the total weight of the adhesive, wherein a minor portion of the starch is gelatinized and the remainder is ungelatinized; (b) an alkali in a concentration of about 3% based on the total weight of a starch; (c) a crosslinking member in a concentration of from 1 to 5%, based on the total weight of the starch, comprising at least 15%, based on the weight of the crosslinking member, of an acetoacetamide-formaldehyde condensate; wherein the acetoacetamide-formaldehyde condensate contains from about 2 to about 6 moles formaldehyde per mole acetoacetamide and the pH during the formation of the condensate is 9.5 to 11.5 and (d) from about 64 to 76% water, based on the total weight of the adhesive.

13. The corrugating adhesive of claim 12 wherein the crosslinking member additionally includes a condensate of acetone-formaldehyde.

14. The corrugating adhesive of claim 12 wherein the crosslinking member comprises at least in part an acetoacetamide-acetone-formaldehyde condensate.

15. A corrugated paperboard product comprising an inner corrugated layer contained between two flat outer layers prepared employing the corrugating adhesive of claim 1.

16. A corrugated paperboard product comprising an inner corrugated layer contained between two flat outer layers prepared employing the corrugating adhesive of claim 12.

* * * * *